W. C. PECKHAM.
Corn-Planter.
No. 227,822.  Patented May 18, 1880.
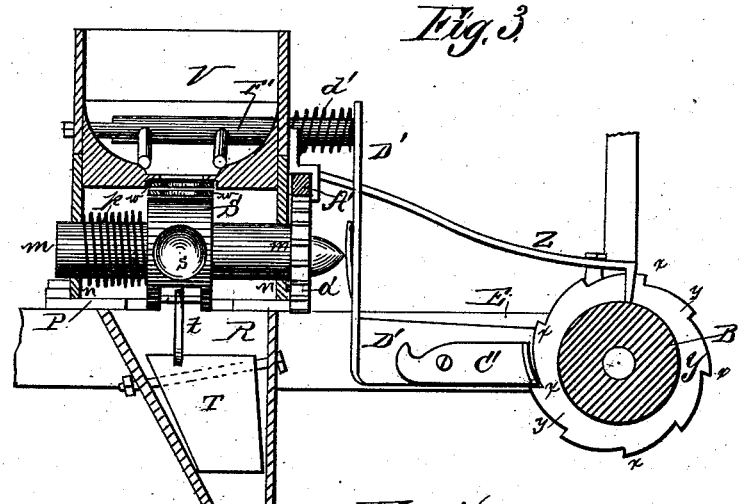
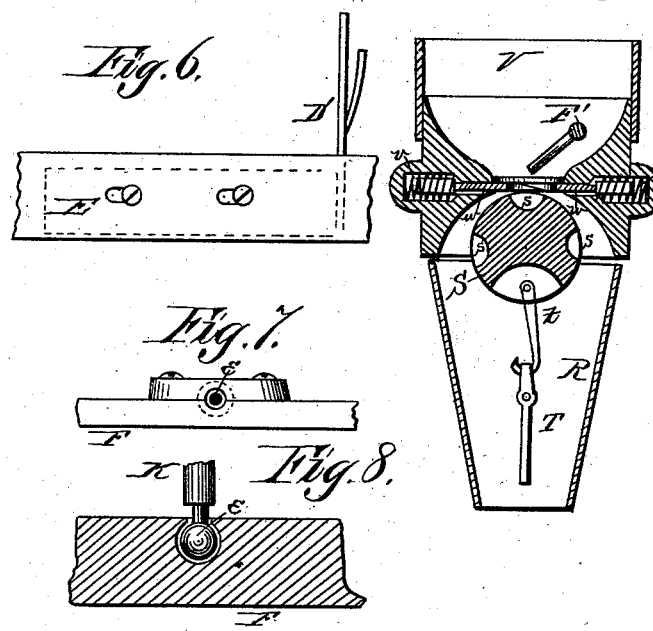
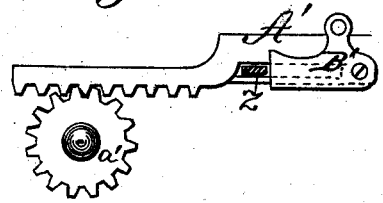
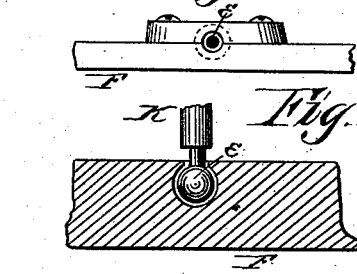
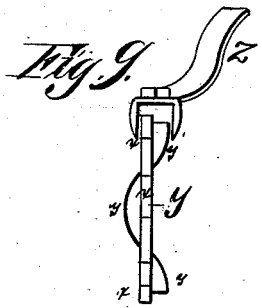
Witnesses:
W. C. McArthur
John C. Rogers
Inventor:
Wm. C. Peckham,
per
J. H. Alexander Elliott
Attorneys.

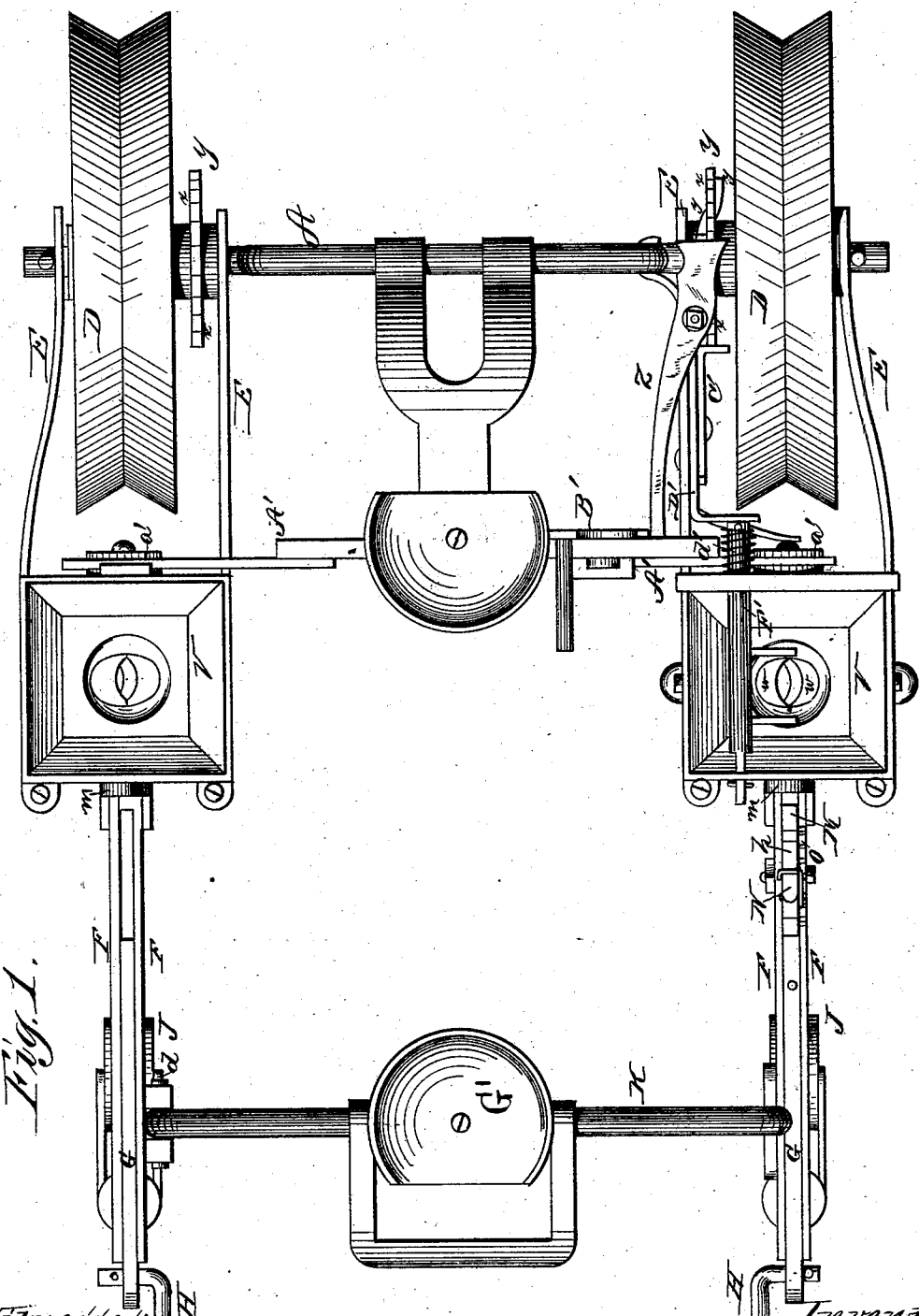

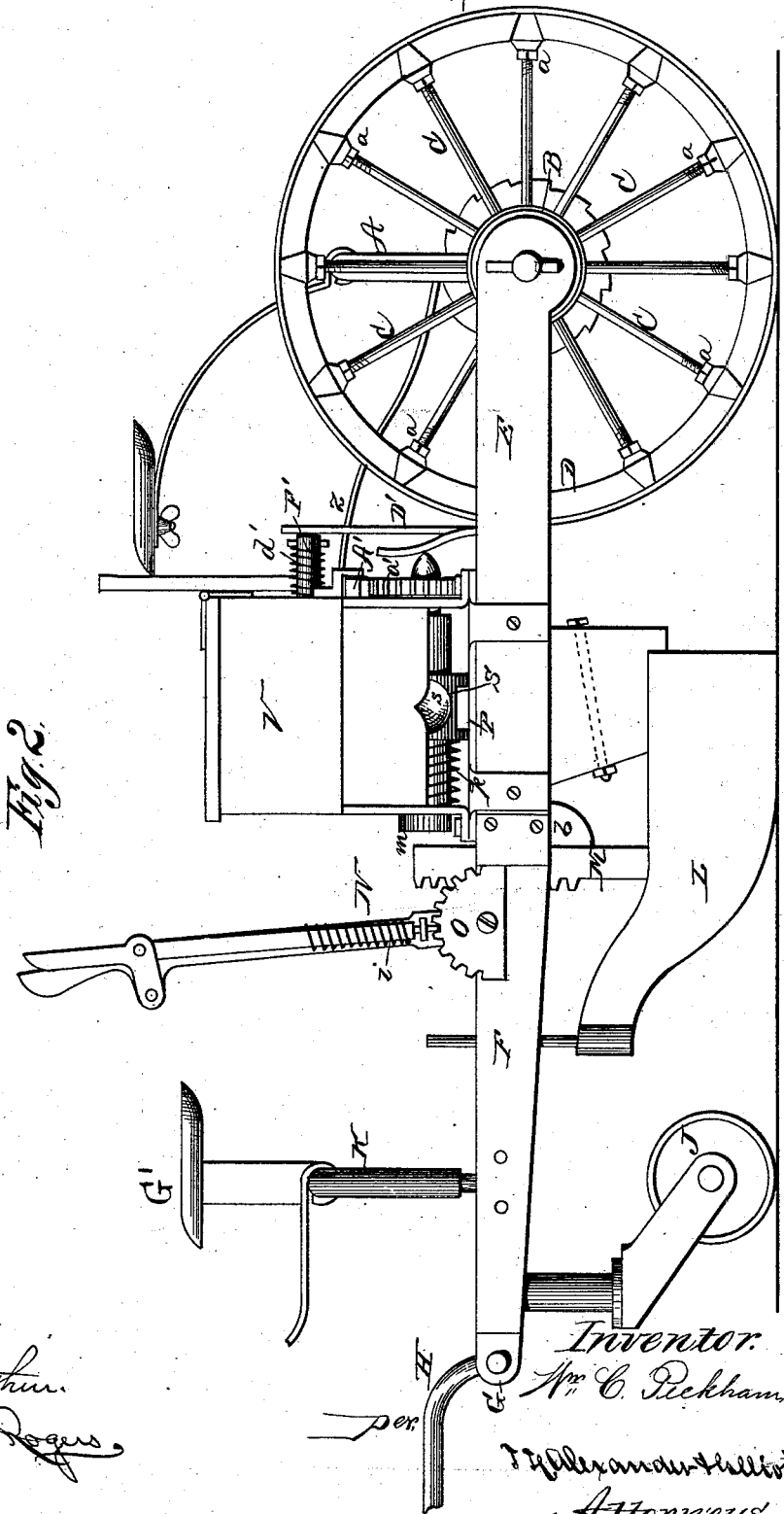

UNITED STATES PATENT OFFICE.

WILLIAM C. PECKHAM, OF TROY, ASSIGNOR OF ONE-HALF OF HIS RIGHT TO DAVID F. McKITRICK, OF MARYSVILLE, OHIO.

CORN-PLANTER.

SPECIFICATION forming part of Letters Patent No. 227,822, dated May 18, 1880.

Application filed December 29, 1879.

*To all whom it may concern:*

Be it known that I, WM. C. PECKHAM, of Troy, in the county of Miami and State of Ohio, have invented certain new and useful Improvements in Corn-Planters; and I do hereby declare that the following is a full, clear, and exact description thereof, reference being had to the accompanying drawings, and to the letters of reference marked thereon, which form part of this specification.

The nature of my invention consists in the construction and arrangement of a seed-planter, as will be hereinafter more fully set forth.

In order to enable others skilled in the art to which my invention appertains to make and use the same, I will now proceed to describe its construction and operation, referring to the annexed drawings, in which—

Figure 1 is a plan view; Fig. 2, a side elevation; and Figs. 3, 4, 5, 6, 7, 8, and 9 are details of parts of my invention.

A represents an arched axle, having a driving-wheel on each end. Each driving-wheel is composed of a hub, B, with two series of staggered spokes, C C, connecting the same with the rim D, the outer end of each spoke being provided with threads, on which is screwed a nut, $a$, to be run out against the inner side of the rim D, so as to tighten the parts and hold them all firmly in position.

The outer face of the rim D is made angular, as shown. Ordinarily the face of these wheels in planters is made concave or flat, which packs the earth too closely, so that the corn or seed often perishes. With the angle-faced wheel the earth is pressed closely on each side, but left loose in the center, so as not to injure the corn or seed.

By means of the arched axle the planter may pass over rocks and stumps, while with the ordinary axle it would be necessary to drive around such obstructions. Each end of the axle passes through the rear ends of two parallel bars, E E, one on each side of the wheel, the forward ends of which are bent inward and bolted to two parallel bars, F F. These bars F F are separated at their rear ends by a vertical guide, $b$, and have a bar, G, between their forward portions, as shown.

The bars E E, F F, and G, on each side, are rigidly secured together and form one side of the planter-frame. In the forward ends of the bars G G are pivoted the hounds H H, to which the tongue is secured. Under the forward end of each side of the frame is a truck or caster wheel, J, bearing up the front of the planter, thereby relieving all weight from the neck of the team and causing the planter to plant in a uniform depth.

The front portions of the sides of the planter are connected by means of an arch, K, one end of which works on a pivot, $d$, while the other end has a globe-joint, $e$, pivoting in any direction, thereby permitting the right and left portions of the planter to move up and down independent of the other. Therefore one side of the planter may pass over any ordinary obstacle and not affect the movement of the other side of the planter.

L represents the cutter, provided with a rack-bar, M, which extends upward in front of the guide $b$ between the bars F F, and is operated by a cogged segment, $h$, formed on the lower end of a lever, N, pivoted between said bars. This lever is provided with a spring-pawl, $i$, to take into a rack, O, and thus hold the cutter at any desired height. The rear part of cutter L—that is, the part in rear of each bar—is constructed with flaring wings, which extend back on each side of the conductor R, for the purpose of opening a furrow for the reception of the grain.

It will, of course, be understood that there is one of these cutters at each side of the planter with separate and independent operating-levers, therefore adapting the machine to plant a uniform depth on the side of a hill or any uneven surface.

On top of the forward portions of the bars E E, on each side, is secured a platform, P, with suitable opening for dropping the seed through the conductor R underneath in rear of the cutter. On this platform are bearings $n\, n$ for the journals $m\, m$ of the dropping-cylinder S. On the front journal of the cylinder is a spiral spring, $p$, which holds the cylinder backward, and at the same time allows of a slight forward movement thereof. In the cylinder S are dropping recesses or cups $s\, s$, and in the under side of the cylinder is a slot, in which is pivoted a link, $t$, and this link connects with the valve T in the conductor R in such a manner as to turn the same from side to side, according as the cylinder is rocked or oscillated.

V is the hopper or seed-box above the cylinder, secured on the platform P, and provided under its bottom with two sliding cut-offs, $w$ $w$, actuated by springs $v$ $v$, as shown, thereby preventing the grain from breaking or the planter from becoming clogged.

The drilling attachment consists of a disk, Y, attached to the hub of the driving-wheel, and provided on its sides with cams $y$ $y$, which vibrate a drilling-lever, Z, pivoted on a stud or post on the frame. The rear end of this lever is forked to straddle the wheel or disk Y, while the forward end works in a slot of the drop-rod A', which passes across the planter from side to side in guides attached to the rear sides of the seed-boxes. The drop-bar A' is at each end provided with cogs, which mesh with pinions $a'$ on the rear journals of the dropping-cylinders S. To the side of the drop-bar A' is pivoted a latch, B', which, when turned down, locks the lever Z in the slot, so that the vibration of said lever will move the drop-bar alternately from side to side, and rock or oscillate the dropping-cylinders. When the latch is raised the lever Z will vibrate without operating the dropping mechanism; and hence it will be seen that by means of the latch B' the machine may be easily and quickly thrown in and out of gear.

The distance between the hills is regulated by the number of cams $y$ on the disk Y. This disk also has on its periphery a series of teeth or notches, $x$ $x$, which operate against a latch, C', pivoted to the side of a slide, D', the forward end of which is bent and bears against the end of the rear journal of the dropping-cylinder, each tooth thus forcing said cylinder forward, while the spring $p$ throws it rearward again. This constitutes a force-feed attachment, causing the cylinder-cavities to be uniformly filled by said cylinder being kept constantly in motion when the planter is in operation. Another arm on the slide D', by the same motion, operates a shaker, F', which passes through the seed-box immediately over the bottom. A spring, $d'$, throws the shaker back.

G' is the driver's seat, located on the front arch, K, in front of the dropper, so that the lines, in driving the team, can never interfere with the dropper.

Having thus fully described my invention, what I claim as new, and desire to secure by Letters Patent, is—

1. The combination of the cam-disk Y, lever Z, cogged drop-bar A', and cylinders S with pinions $a'$, substantially as and for the purposes herein set forth.

2. The combination of the vibrating lever Z, slotted drop-bar A', and latch B', substantially as and for the purposes herein set forth.

3. The combination of the toothed cam-disk Y, latch C', slide D', and dropping-cylinder S with spring $p$, substantially as and for the purposes herein set forth.

4. The combination of the slide D', shaker F', and spring $d'$, substantially as and for the purposes herein set forth.

5. The combination, in a seeding-machine, of the dropping-cylinder S, shaker F', slide D', latch C', and toothed disk Y, all constructed and arranged to operate substantially as set forth.

In testimony that I claim the foregoing as my own I affix my signature in presence of two witnesses.

WM. C. PECKHAM.

Witnesses:
   CALVIN D. WRIGHT,
   WALTER J. THOMAS.